(No Model.)
J. J. HOLLAND & E. J. TONER.
PIPE COUPLING.
No. 307,648. Patented Nov. 4, 1884.
Fig. 1.
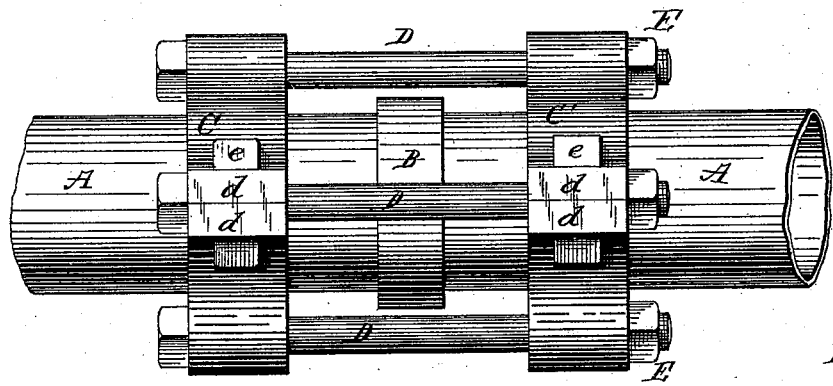
Fig. 5.
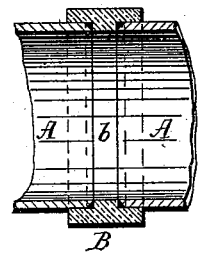
Fig. 2.
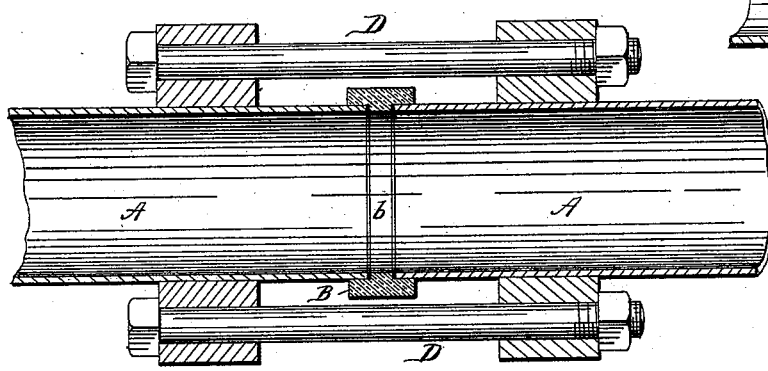
Fig. 3.
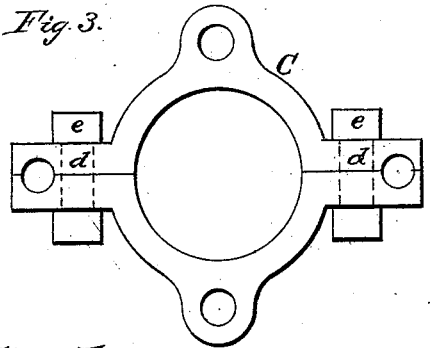
Fig. 4.
Attest:—
G. Smith.
T. J. Patterson.
John J. Holland
Edward J. Toner
Inventors
Connolly Bros & McTighe
Attorneys.

UNITED STATES PATENT OFFICE.

JOHN J. HOLLAND AND EDWARD J. TONER, OF PITTSBURG, PENNSYLVANIA.

PIPE-COUPLING.

SPECIFICATION forming part of Letters Patent No. 307,648, dated November 4, 1884.

Application filed December 4, 1883. (No model.)

*To all whom it may concern:*

Be it known that we, JOHN J. HOLLAND and EDWARD J. TONER, of Pittsburg, in the county of Allegheny and State of Pennsylvania, have invented certain new and useful Improvements in Pipe-Couplings; and we do hereby declare that the following is a full, clear, and exact description of the invention, which will enable others skilled in the art to which it appertains to make and use the same, reference being had to the accompanying drawings, which form a part of this specification, in which—

Figure 1 is a side view of our coupling applied. Fig. 2 is a longitudinal section of same. Fig. 3 is a face view of one of the clamps. Fig. 4 is a similar view of a modified form of clamp.

This invention has relation to certain improvements in pipe-couplings, and has for its special object the provision of a coupling for pipes made of such thin metal that the threading of the ends to form a screw-joint is impracticable or inexpedient.

This invention accordingly consists in the novel construction and combination of devices constituting an effective coupling for said pipes, but adapted as well for coupling pipes in which the ordinary or any of the known means of coupling are insufficient.

Referring to the accompanying drawings, A A designate two sections or lengths of pipe or tubing having their ends coupled by our coupling, and, for the better application of the same, formed with plain or unthreaded ends.

B designates a socket or ring, preferably made of lead, zinc, Babbitt metal, or other metal susceptible of compression, to fit closely against or upon the surfaces of the pipes at the point of coupling, and therefore adapted to close and tighten the seam and seal the same. This socket is made to encircle the joint, but is formed with an internal flange, b, against which the ends of the pipes abut, and which, keeping the ends slightly separated, completely and hermetically fills the joint or space.

C C' designate two sectional clamps or bands constructed and adapted to embrace the pipes, as shown. These clamps are made each in two or as many parts as may be desirable and of any suitable contour, provision being made for the passage and bearing of the coupling-rods or draw-bolts by which the two clamps are connected together. The sections of each clamp are made with bolt seats or flanges d for the passage of the short bolts e, by which the sections are coupled to produce a complete clamp or band, and by which the latter is sufficiently tightened upon the pipe. The seats or flanges d are grooved or channeled on their inner or contacting surfaces for the reception of the bolts D. Nuts E, upon the ends of the bolts D, are employed for tightening the latter and drawing the clamps, and with them the pipe-sections, toward each other.

In coupling together the sections of pipe the socket B is fitted in position, and the sectional clamps, with their bolts inserted, put on and tightened against the pipes at suitable distances from the joint. The nuts E are then fitted on the ends of the rods D, and then turned up against the clamp C, causing the ends of the pipes to bear strongly against the flange of the joint-socket B and produce a perfectly tight and even joint. Should the joint at any time become loose, enlarged, or leaky, the coupling may be adjusted to close or tighten the joint.

As will be seen, this coupling is susceptible of very ready application and of speedy removal, and requires no preparation of the pipe. It makes a joint which is very stiff and is well calculated to sustain long lines of pipe in a rigid manner.

Instead of holes being formed in the clamps for the draw-bolts, the clamps may be made, as in Fig. 4, with notches, allowing of more convenient handling and insertion of the bolts.

It will be observed that the inside surface of the clamps fits the pipe, and therefore has an equal bearing on the pipe, so that in being tightened upon the pipe there is no tendency to bend or indent the latter.

The flanged socket B may be of cast-iron or other hard metal, and the seat portion provided with a ring or gasket of soft metal or suitable material. Such a gasket is shown in Fig. 2. When the pipes are cut off with the ordinary hand-cutter, the ends usually exhibit a beveled shape.

We adapt our coupling to such by making the socket B with a square shoulder, as before, and insert a beveled lead or other soft gasket, as in Fig. 5, so that when the clamps are applied and drawn toward each other the beveled pipe ends make a tight joint. This form is convenient where the cutting of the pipe has to be done at the place of use.

Having described our invention, we claim—

In a pipe or tube coupling, the combination of the internally-flanged ring B, sectional friction-clamps C C', having side flanges or bolt-seats, d, with longitudinal grooves or channels on their adjacent faces, clamping-bolts e, and suitable coupling-bolts, D, and nuts E, the whole adapted to be clamped upon the adjacent ends of two pipes and draw the latter to a bearing upon the ring B, substantially as described.

In testimony that we claim the foregoing as our own we have hereto affixed our signatures in presence of two witnesses.

JOHN J. HOLLAND.
EDWARD J. TONER.

Witnesses:
   T. J. PATTERSON,
   T. J. McTIGHE.